(12) United States Patent
Lampinen et al.

(10) Patent No.: US 11,026,075 B2
(45) Date of Patent: *Jun. 1, 2021

(54) APPARATUS AND METHOD FOR SCHEDULING ORDER OF DOWNLINK CONTROL INFORMATION IN A WIRELESS NETWORK

(71) Applicant: Spreadtrum Hong Kong Limited, Shanghai (CN)

(72) Inventors: Karl Marko Juhani Lampinen, Oulu (FI); Arto Johannes Lehti, Oulu (FI)

(73) Assignee: SPREADTRUM HONG KONG LIMITED, Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/832,736

(22) Filed: Mar. 27, 2020

(65) Prior Publication Data

US 2020/0228952 A1 Jul. 16, 2020

Related U.S. Application Data

(63) Continuation of application No. 14/825,800, filed on Aug. 13, 2015, now Pat. No. 10,638,286.

(51) Int. Cl.
*H04W 4/70* (2018.01)
*H04W 72/12* (2009.01)

(52) U.S. Cl.
CPC ......... *H04W 4/70* (2018.02); *H04W 72/1289* (2013.01); *H04W 72/1273* (2013.01)

(58) Field of Classification Search
CPC ........................... H04W 4/70; H04W 72/1289
(Continued)

(56) References Cited

U.S. PATENT DOCUMENTS 9,629,140 B2 4/2017 Morioka
9,860,884 B2 1/2018 Kim et al.
(Continued)

OTHER PUBLICATIONS

"Revised WI—Further LTE Physical Layer Enhancements for MTC," 3GPP TSG RAN Meeting #67 Shanghai, China, Mar. 9-12, 2015, RP-150492.
(Continued)

*Primary Examiner* — Angel T Brockman
(74) *Attorney, Agent, or Firm* — Finnegan, Henderson, Farabow, Garrett & Dunner, LLP

(57) ABSTRACT

Apparatuses and methods provide for scheduling downlink control information in a wireless network. The apparatuses and methods may determine at least one control message for a user equipment and a downlink grant to be scheduled, and schedule transmission of one of the at least one control message with the downlink grant to precede transmission of related data on a downlink data channel. The apparatuses and methods may alternatively schedule a control message other than downlink grant for a user equipment, determine a downlink grant to be scheduled, and schedule a control message with the downlink grant to end last among all control messages in a search space. The apparatuses and methods may further alternatively schedule control messages for a user equipment, including one control message with a downlink grant and scheduled to end at the same time as or a later time than other control messages in a search space.

16 Claims, 18 Drawing Sheets

(58) Field of Classification Search
USPC ........................................................ 370/336
See application file for complete search history.

(56) References Cited

U.S. PATENT DOCUMENTS

| | | |
|---|---|---|
| 2012/0188958 A1 | 7/2012 | Suzuki et al. |
| 2013/0250822 A1 | 9/2013 | Yang et al. |
| 2014/0044084 A1 | 2/2014 | Lee et al. |
| 2015/0023145 A1 | 1/2015 | Kim et al. |
| 2015/0181576 A1 | 6/2015 | Papasakellariou et al. |
| 2015/0237179 A1 | 8/2015 | Sridhar et al. |
| 2017/0048885 A1* | 2/2017 | Lampinen ............... H04W 4/70 |

OTHER PUBLICATIONS

"3rd Generation Partnership Project; Technical Specification Group Radio Access Network; Study on provision of low-cost Machine-Type Communications (MTC) UserEquipments (UEs) based on LTE (Release 12)," 3GPP TR 36.888 vol. 12.0.0, Jun., 2013, 55 pages.

"3rd Generation Partnership Project; Technical Specification Group Radio Access Network; Evolved Universal Terrestrial Radio Access (E-UTRA); Multiplexing and channel coding (Release 12)", 3GPP TS 36.212 vol. 12.4.0, Mar. 2015, 94 pages.

"Details on M-PDCCH search space design," LG electronics, 3GPP TSG RAN WG1 Meeting #81, Fukuoka, Japan May 25-29, 2015, R1-152698, 8 pages.

"Consideration on DCI for LC-MTC", Alcatel-Lucent Shanghai Bell, Alcatel-Lucent, 3GPP TSG RAN WG1 Meeting #81, Fukuoka, Japan May 25-29, 2015, R1-152601, 3 pages.

"M-PDCCH and HARQ Options for HD-FDD in Normal Coverage", Sierra Wireless, 3GPP TSG-RAN WG1 Meeting 81, Fukuoka, May 25-29, 2015, R1-153111, 7 pages.

"Remaining Details of PBCH Repetition," 3GPP TSG-RAN WG1 Meeting #81, Fukuoka, Japan, May 25-29, 2015, R1-152550,2 pages.

"Physical Downlink Control Channel for MTC," 3GPP TSG-RAN WG1 Meeting #81 Fukuoka, Japan, May 25-29, 2015, R1-152540, 4 pages.

"Frequency hopping for MTC," 3GPP TSG-RAN WG1 Meeting #81 Fukuoka, Japan, Apr. 25-29, 2015, R1-152495, 3 pages.

"PRB group definitionfor MTC," 3GPP TSG RAN WG1 Meeting #81 Fukuoka, Japan, May 25-29, 2015, R1-152494, 6 pages.

"Frequency Hopping for UEs in Coverage Enhancement," 3GPP TSG-RAN WG1 Meeting #81, Fukuoka, Japan , May 25-29, 2015, R1-152538, 3 pages.

"Timing Relationship for MTC," 3GPP TSG-RAN WG1 Meeting #81 Fukuoka, japan, May 25-29, 2015, R1-152539, 5 pages.

"Discussion on multiplexing of ePDCCH and PDSCH," 3GPP TSG-RAN WG1 #68 Dresden, Germany, Feb. 6-10, 2012, R1-120638, 3 pages.

"3rd Generation Partnership Project; Technical Specification Group Radio Access network; Evolved Universal Terrestrial Radio Access (E-UTRA); Physical channels and modulation (Release 12)," 3GPP TS 36.211 vol. 12.6.0, Jun. 2015, 136 pages.

\* cited by examiner

APPARATUS AND METHOD FOR SCHEDULING ORDER OF DOWNLINK CONTROL INFORMATION IN A WIRELESS NETWORK

This application is a continuation of U.S. application Ser. No. 14/825,800, filed Aug. 13, 2015, which is incorporated herein by reference in its entirety.

BACKGROUND

I. Technical Field

The present disclosure relates to enhancing coverage in a wireless network and in particular relates to apparatuses and methods for providing scheduling order of downlink control information (DCI) in a wireless network.

II. Background

From Global System for Mobile Communications/General Packet Radio Service (GSM/GPRS) to Long Term Evolution (LTE), cellular networks have evolved to support higher data rates and wider coverage. At the same time, the evolution has brought about technical challenges, including, for example, support for high complexity as well as low complexity devices, and cost of overall network maintenance with a large number of radio access technologies (RATs) as evolved network deployments, for example LTE, may require.

With respect to supporting low cost and low complexity devices, Machine-Type Communications (MTC) has been considered as a market likely to expand in the future. MTC is a form of data communication which involves one or more entities that do not necessarily need human interaction. A service optimized for machine type communications differs from a service optimized for Human to Human communications. MTC is different to current mobile network communication services as it involves different market scenarios. Distinctive MTC features may include low mobility, small data transmissions, infrequent termination originated by MTC User Equipment (UE), group based policing and group based addressing. These MTC features derive to low cost and low complexity MTC UEs. MTC UE is a user equipment supporting MTC capabilities in present application. As an example, MTC UE may be a vending machine, a water meter, a gas meter, etc.

It is envisaged that MTC UEs will be deployed in huge numbers, large enough to create an eco-system on its own. MTC UEs used for many applications will require low operational power consumption and are expected to communicate with infrequent small burst transmissions. Some operators see MTC via cellular networks as a significant opportunity for new revenues, because the operators can efficiently serve MTC UE using already deployed RAT.

In addition, there is a substantial market for MTC UEs deployed inside buildings. For example, some MTC UEs are installed in the basements of residential buildings or locations shielded by foil-backed insulation, metalized windows, or traditional thick-walled building construction, and would experience significantly greater penetration losses on the radio interface than normal LTE devices. The MTC UEs in the extreme coverage scenario might have characteristics such as very low data rate, greater delay tolerance, and no mobility, and therefore some messages/channels may not be required. It is necessary to find a solution to support low-end MTC UEs in LTE system.

$3^{rd}$ Generation Partnership Project (3GPP) has studied to find a solution. It was concluded in 3GPP TR 36.888 that a target coverage improvement of 15-20 dB for both Frequency Division Duplexing (FDD) and Time Division Duplexing (TDD) in comparison to normal LTE footprint could be achieved to support MTC devices deployed in challenging locations, e.g., deep inside buildings, and to compensate for gain loss caused by complexity reduction techniques. It was also concluded in 3GPP TR 36.888 that, in order to increase coverage of LTE system, data or control subframes must be repeated multiple times, and a number of repetition between 42 and 400 have been disclosed in section 9.5.6.1 for Physical Downlink Shared CHannel (PDSCH).

It has further been assumed that downlink data transmission can take place on different frequencies than downlink control. Associated control and data are time multiplexed. The time multiplexing and repetition of the downlink control and data subframes create a scheduling problem because all downlink control subframes should be received before starting the actual data reception or at least the repetition factor should be taken into account when determining timing for the transmission of data subframes. It may be possible for UE to be able to receive downlink control correctly without receiving all the repetitions but since that cannot be known by an evolved node B (eNB) the transmission of downlink data can start only after all control repetitions have been transmitted. Furthermore, UE should be able to receive multiple downlink control messages in order to use the system efficiently. For example, there may be a need for simultaneous uplink and downlink data grants. In LTE system data, transmissions both in downlink and uplink are always granted by the eNB by using downlink control channel. The grant contains information on frequency and time resources of the data channel and possibly information on the transmission format such as modulation and channel coding rate.

The current LTE system has multiple DCI formats for downlink control information on Physical Downlink Control CHannel (PDCCH), or Enhanced-PDCCH (E-PDCCH). 3GPP TS 36.212 describes a plurality of DCI formats. For example, DCI format 0 is used for scheduling of PUSCH in one uplink cell. DCI format 1 is used for scheduling of one PDSCH codeword in one cell, and DCI format 1A is used for the compact scheduling of one PDSCH codeword in one cell and random access procedure initiated by a PDCCH order. DCI format 2 is used for transmitting carrier indicator, downlink scheduling information, and so on. DCI format 2A carries carrier indicator, resource allocation header, resource block assignment, precoding information, etc. DCI format 2B carries scrambling identity, downlink assignment index, carrier indicator, resource allocation header, resource block assignment, etc. DCI format 3 and 3A are used for the transmission of TPC commands for PUCCH and PUSCH with 2-bit power adjustments. DCI format 4 is used for scheduling of PUSCH in one uplink cell with multi-antenna port transmission mode.

A UE may need to receive multiple DCIs in a single subframe. In current LTE frame structure both PDCCH and E-PDCCH are located completely in the same subframe as the associated PDSCH data, as shown in FIG. 6. In prior art frame structure 600, both PDCCH 660 and E-PDCCH 630 and 640 are located in the same subframe 620 as associated PDSCH 650, as current LTE systems provide. That is, a UE 110 may be configured to receive all downlink control channels as well as downlink shared channel in the same subframe 620 over a system bandwidth 610.

A legacy UE can receive all the data in the current system since the whole system bandwidth is received by the UE all the time. For example, a legacy UE supporting LTE Release 12 with MTC features can receive the whole system bandwidth. The legacy UE, however, does not support repetitions and hence can receive control information over PDCCH or E-PDCCH. In other words, a legacy UE, including an MTC capable UE, may be able to receive PDSCH data and possibly downlink control information, such as uplink grant or Physical Hybrid ARQ Indicator CHannel (PHICH) or uplink power control commands, which are transmitted on PDCCH or E-PDCCH. On the other hand, an MTC UE supporting LTE Release 13 and onward releases can receive narrowband only and support repetitions. The MTC UE supporting LTE Release 13 and onwards can thus reuse MTC PDCCH. In the present application, the terminology of MTC UE for invention is directed to a UE which is MTC capable and supports LTE Release 13 and onward releases.

In the present disclosure, unless otherwise specified, PDCCH refers to MTC PDCCH when discussed in context of MTC UE. Compared to the legacy PDCCH, which is transmitted using an entire system bandwidth, MTC PDCCH is transmitted over one narrow band. Therefore, the legacy PDCCH cannot be used for MTC.

3GPP R1-153111, a proposal submitted by Sierra Wireless, proposes simultaneous transmission of uplink and downlink grants for MTC normal coverage case where repetition over multiple subframes is not used. This resembles the current LTE system where any control is transmitted in a subframe and UE can receive all the control. 3GPP document in R1-153111 also assumes that PDCCH and PDSCH can be simultaneously received, which may not be the case if repetition and frequency hopping over narrow bands are used in the enhanced coverage case. R1-153111 further considers that it is more efficient to first exhaust the frequency domain allocation rather than the repetition in time. Hence, repetition is used after the transmission already fills the entire narrow band.

3GPP R1-152601, proposal submitted by Alcatel-Lucent et. al., proposes different timing of different length DCIs in order to reduce simultaneous blind decoding but this proposal does not cover possible need to change a narrow band in MTC. Furthermore, the timing proposal in 3GPP R1-152601 does not specify whether it falls on the assumed search space constraints or not. This proposal introduces a method to reduce complexity by reducing number of simultaneous decoding. Although the proposal discusses the reception of multiple, possibly repeated, DCIs, it does not propose what UE should do after successfully decoding a DCI, for example, whether to continue decoding further DCI candidates or possibly change narrowband which would prevent reception of the rest of the DCIs.

Therefore, the present application intends to provide a solution of scheduling order of DCI to a certain UE such a way that data reception and possible frequency change does not happen before transmission of all DCI is finished.

SUMMARY

Consistent with embodiments of this disclosure, there is provided a method of scheduling downlink control information in a wireless network. The method includes determining at least one control message for a user equipment. The method also includes determining a downlink grant to be scheduled. The method further includes scheduling transmission of one of the at least one control message with the downlink grant to precede any transmission of related data on a downlink data channel.

Consistent with embodiments of this disclosure, there is also provided a method of providing scheduling order of downlink control information in a wireless network. The method includes scheduling a control message other than downlink grant for a user equipment. The method also includes determining that a downlink grant is to be scheduled. The method also includes scheduling a control message including downlink control information having the downlink grant to end last among all control messages in a search space.

Consistent with embodiments of this disclosure, there is also provided a method of providing scheduling order of downlink control information in a wireless network. The method includes scheduling a plurality of control messages for a user equipment, including one control message configured to include downlink control information having a downlink grant and scheduled to end at the same time as or a later time than other control messages in a search space.

Consistent with embodiments of this disclosure, there is also provided a method of receiving downlink control information in a wireless network. The method includes receiving a plurality of control messages, and determining that one control message of the plurality of control messages includes downlink control information having a downlink grant. The method also includes receiving the downlink grant one time on a narrow band in a search space.

Consistent with embodiments of this disclosure, there is further provided an apparatus for scheduling downlink control information in a wireless network. The apparatus comprises at least a processor and a computer readable storage medium storing programming for execution by the processor. The processor is configured to determine at least one control message for a user equipment and a downlink grant to be scheduled. The processor is further configured to schedule transmission of one of the at least one control message with a downlink grant to precede any transmission of related data on a downlink data channel.

Consistent with embodiments of this disclosure, there is further provided an apparatus for providing scheduling order of downlink control information in a wireless network. The apparatus comprises at least one processor and a computer readable storage medium storing programming for execution by the processor. The processor is configured to determine at least one control message for a user equipment and a downlink grant to be scheduled. The processor is further configured to schedule a control message including downlink control information having a downlink grant to end last among all control messages in a search space.

Consistent with embodiments of this disclosure, there is further provided an apparatus for providing scheduling order of downlink control information in a wireless network. The apparatus comprises at least one processor and a computer readable storage medium storing programming for execution by the processor. The processor is configured to schedule a plurality of control messages for a user equipment, wherein one control message from the plurality of control messages is configured to include downlink control information having a downlink grant and scheduled such that the downlink grant ends at the same time as or a later time than other control messages in a search space.

Consistent with embodiments of this disclosure, there is further provided an apparatus for providing scheduling order of downlink control information in a wireless network. The apparatus comprises at least one processor and a computer readable storage medium storing programming for execution by the processor. The processor is configured to receive a plurality of control messages and determine that one control message of the plurality of control messages includes downlink control information having a downlink grant. The processor is further configured to receive the downlink grant one time on a narrow band in a search space.

Consistent with other disclosed embodiments, non-transitory computer-readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
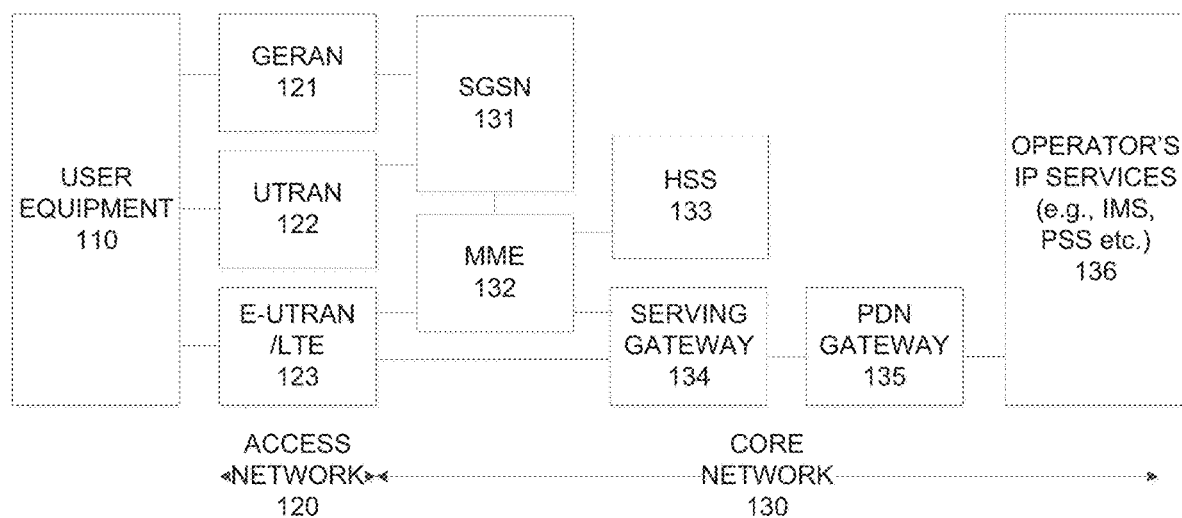
FIG. 1 shows an exemplary system architecture of wireless networks according to an illustrative embodiment of the present disclosure.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Consistent with disclosure herein, there are provided apparatuses, systems, UEs, and methods for providing scheduling order of DCI in machine type communications in a wireless network. Apparatuses may include a receiver of a system, a UE or both.

The present disclosure proposes methods for providing scheduling order of DCI in a machine type communications. However, the proposed methods would apply to other communications or networks, systems and/or devices requiring a scheduling order between control information and data to ensure safe receipt of control information before data transmissions.

FIG. 1 shows an exemplary architecture of a wireless network system 100 according to an illustrative embodiment of the present disclosure. System 100 may comprise, for example, a plurality of UEs 110, access network 120, and core network 130.

UEs 110 are end-user devices, i.e., devices operated by end users, and may each be a mobile device, a wireless device, a station, a client device, a laptop, a desktop, a tablet, etc. In particular, UEs 110 in the present application are considered in context of MTC (e.g., MTC UE).

A UE 110 may support one or more access technologies to communicate with GSM EDGE Radio Access Network (GERAN) 121, Universal Terrestrial Radio Access Network (UTRAN) 122, and/or Evolved-UTRAN (E-UTRAN)/LTE 123. UE 110 may transmit and receive control and data signals via one or more transceivers and provide various applications for a user such as Voice over Internet Protocol (VoIP) application, video steaming, instant messaging, web browsing, and so on.

Access network 120 may provide one or more radio access technologies such as GERAN 121, UTRAN 122, E-UTRAN/LTE 123. Core network 130 may comprise at least one of Serving GPRS Support Node (SGSN) 131, Mobility Management Entity (MME) 132, Home Subscriber Server (HSS) 133, SERVING GATEWAY 134, Packet Data Network (PDN) GATEWAY 135, and operator's Internet Protocol services 136 such as IP Multimedia Subsystem (IMS), Packet Switched Streaming Service (PSS), etc. System 100 may interconnect with other components, which are not shown for simplicity. For example, access network 120 may also include other access technologies such as Code Division Multiple Access (CDMA), Wideband CDMA (WCDMA), WLAN, Worldwide Interoperability for Microwave Access (WiMAX), etc., which are not shown in FIG. 1.

GERAN 121 may comprise a plurality of base transceiver stations and base station controllers. A base transceiver station is an initial access point that a UE 110 communicates for wireless service. A base transceiver station may transmit and receive radio signals via one or more transceivers on different frequencies and serve several sectors of a cell. A base transceiver station may also encrypt and decrypt communications. One base station controller may control or manage a plurality of base transceiver stations. A base station controller may allocate radio channels, receive measurement from UE 110, and control handover between different base transceiver stations.

UTRAN 122 may comprise a plurality of Node Bs and Radio Network Controllers (RNCs). A Node B in UTRAN 122 is equivalent to a base transceiver station in GERAN 121. A Node B may include one or more radio frequency transceivers used to directly communicate with a plurality of UEs 110. A Node B may serve one or more cells depending on configuration and type of antenna. An RNC may be responsible for controlling a plurality of Node Bs. An RNC may also perform radio resource management and mobility management functions. An RNC may further connect to a circuit switched core network through a media gateway and to SGSN 131 in packet switched core network.

E-UTRAN/LTE 123 may comprise a plurality of eNBs. Functionalities of an eNB may include radio resource management. An eNB may also schedule and transmit paging messages and broadcast information, and measure and report measurement configuration for mobility and scheduling. An eNB may further select an MME 132 at UE 110 attachment and route user plane data toward SERVING GATEWAY 134.

GERAN 121 and UTRAN 122 may communicate with SGSN 131 for data services. E-UTRAN/LTE 123 may communicate with MME 132 for data services. SGSN 131 and MME 132 may also communicate with each other, when necessary.

SGSN 131 may be responsible for delivery of data packets from/to UE 110 within its geographical service area. SGSN 131 may perform packet routing and transfer, mobility management, attach/detach and location management, logical link management and authentication and charging functions.

MME 132 is a key control node for E-UTRAN/LTE 123. MME 132 may be responsible for the paging and tagging procedure including retransmissions for UEs in idle mode. MME 132 may also be responsible for choosing SERVING GATEWAY 134 for a UE 110 at an initial attach and at time of intra-LTE handover involving core network node relocation. MME 132 may further be responsible for authenticating a user by interacting with HSS 133.

HSS 133 may be a database storing user and subscription information. HSS 133 be responsible for mobility management, call and session establishment support, user authentication and access authorization.

SERVING GATEWAY 134 may be responsible for routing and forwarding user data packets, while also acting as a mobility anchor for a user plane during inter-eNB handovers and as an anchor for mobility between LTE and other 3GPP technologies. SERVING GATEWAY 134 may terminate downlink data path and trigger paging when downlink data arrives for a UE 110 in the idle mode. SERVING GATEWAY 134 may also manage and store UE contexts, e.g., parameters of IP bearer service, network internal routing information, replication of user traffic in case of lawful interception.

PDN GATEWAY 135 may, as a point of exit and entry of traffic, provide connectivity from a UE 110 to external packet data networks. A UE 110 may have simultaneous connectivity with more than one PDN GATEWAY 135 for accessing multiple PDNs. PDN GATEWAY 135 may perform policy enforcement, packet filtering for each user, sharing support, lawful interception, and packet screening. PDN GATEWAY 135 may further act as an anchor for mobility between 3GPP and non-3GPP technologies such as WiMAX, CDMAIX, and (EVolution Data Optimized) EVDO.

The operator may provide specific IP services for certain applications. For example, the operator's IP services 136 may include, IP Multimedia Subsystem (IMS) and Packet Switched Streaming Service (PSS). IMS is an architectural framework for delivering IP multimedia services based on session-related protocols defined by Internet Engineering Task Force (IETF). IMS may aid access of multimedia and voice applications from wireless and wireline terminals, i.e., to create a form of fixed-mobile convergence. PSS may provide a streaming platform which supports a multitude of different applications including streaming of news at very low bitrates using still images and speech, music listening at various bitrates and qualities, video clips and watching live sports events. In addition to streaming, the platform supports also progressive downloading of media for selective media types.

Figure 2:
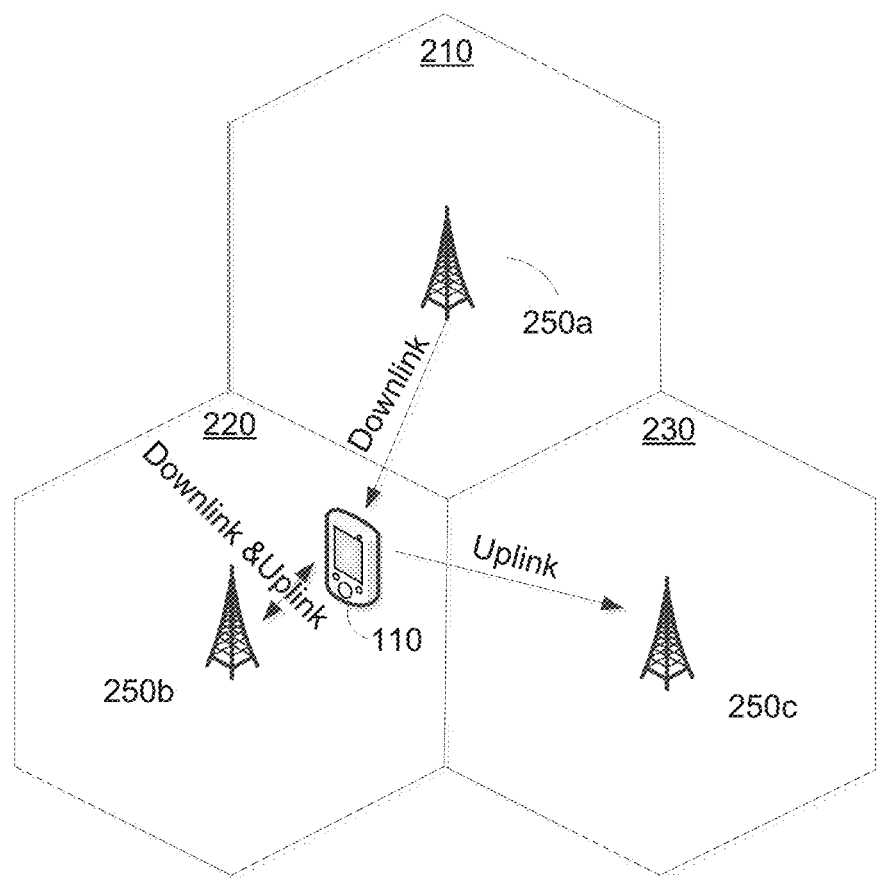
FIG. 2 illustrates an exemplary system providing uplink and downlink services according to an illustrative embodiment of the present disclosure.

FIG. 2 illustrates an exemplary system 200 providing uplink and downlink services according to an illustrative embodiment of the present disclosure. In particular, FIG. 2 shows a plurality of cells, e.g., 210, 220, and 230, managed by a plurality of base stations, e.g., 250*a*, 250*b*, 250*c*, respectively, in order to provide data services to UE 110 in a wireless or cellular network. Base station 250 (e.g., 250*a*-250*c*) is an initial access point to transmit and receive radio signals from/to UE 110. Base station 250 may be equivalent to a base transceiver station in GERAN 121, a Node B in UTRAN 122, or an eNB in E-UTRAN/LTE 123. A base station 250 (e.g., 250*a*-250*c*) may control a plurality of cells, although FIG. 2 shows each base station controlling only one cell. Base station 250 and UE 110 transmit and receive a plurality of uplink and downlink control signals, and uplink and downlink data signals. For example, to maintain connection with base station 250*a* in cell 210, base station 250*b* in cell 220 and base station 250*c* in cell 230, UE 110 may be configured to receive downlink control or data signals from base stations 250*a*-250*c*. UE 110 may be configured to generate and transmit uplink control or data signals to base station 250*b*.

Figure 3:
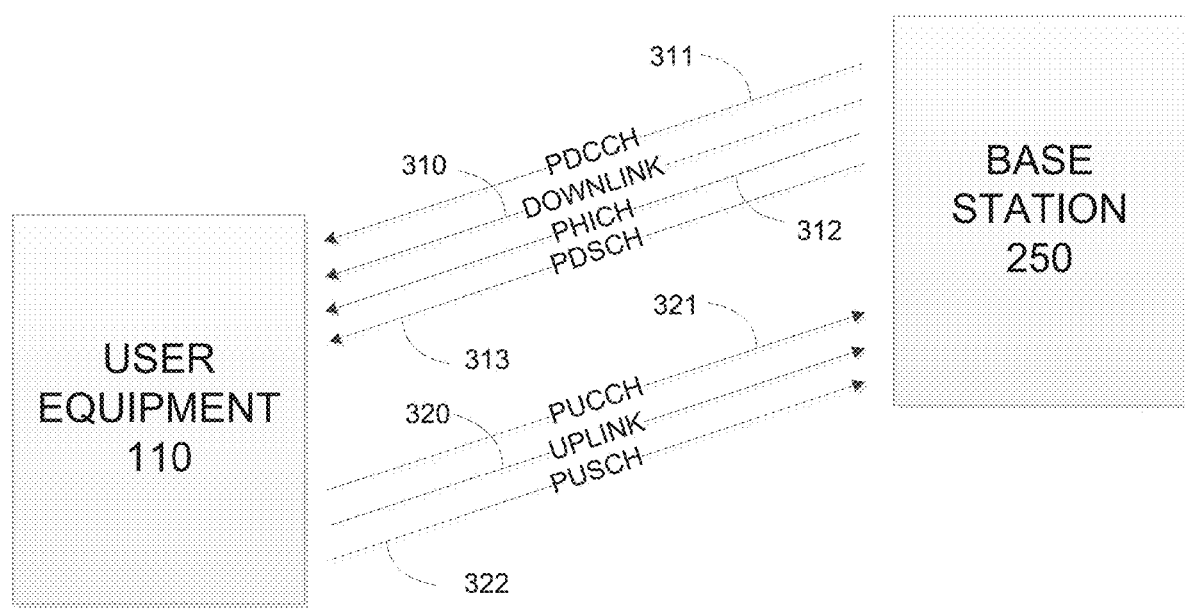
FIG. 3 illustrates an exemplary system providing uplink and downlink services and its control and data channels according to an illustrative embodiment of the present disclosure.

FIG. 3 illustrates an exemplary system 300 providing uplink and downlink services for control and data channel transmissions according to an illustrative embodiment of the present disclosure. Uplink and downlink services include generating and transmitting uplink and downlink control/data signals between a UE 110 and a base station 250 (e.g., 250*a*-250*c*). Particularly, uplink and downlink physical channels correspond to resource elements carrying information originating from higher layers and exchanged between a UE 110 and a base station 250 (e.g., 250*a*-250*c*).

Uplink physical channels may include, for example, Physical Uplink Control CHannel (PUCCH), Physical Uplink Shared CHannel (PUSCH), and Physical Random Access CHannel (PRACH). Downlink physical channels may include, for example, PDSCH, Physical Broadcast CHannel (PBCH), Physical Multicast CHannel (PMCH), Physical Control Format Indicator CHannel (PCFICH), PDCCH, Physical PHICH, and E-PDCCH.

As an example, FIG. 3 shows a system 300 that a base station 250 (e.g., 250a-250c) may be configured to generate and send a UE 110 one or more of PDCCH 311, PHICH 312 PDSCH 313, and E-PDCCH (not shown) via downlink 310. The UE 110 may also be configured to generate and transmit one or more of PUCCH 321 and PUSCH 322 via uplink 320.

Figure 4:
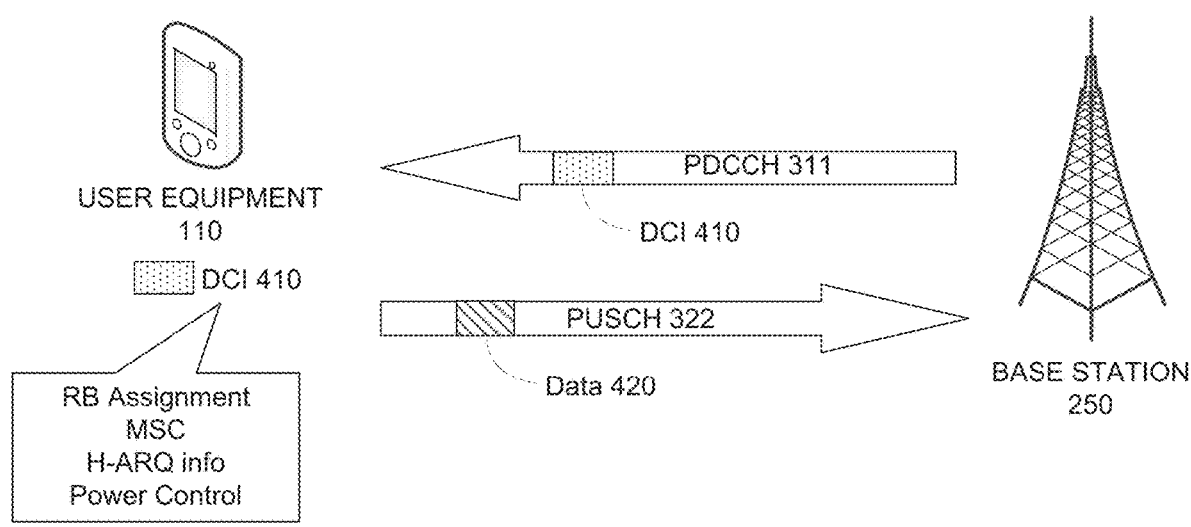
FIG. 4 illustrates an exemplary system providing downlink control and uplink data channels according to an illustrative embodiment of the present disclosure.

FIG. 4 shows an exemplary system 400 providing downlink control and uplink data channels according to an illustrative embodiment of the present disclosure. A base station 250 (e.g., 250a-250c) may be configured to carry DCI 410 via, for example, PDCCH 311 or E-PDCCH (not shown). DCI 410 may convey various pieces of information. DCI 410 may include information used to transport downlink, uplink or sidelink scheduling information. DCI 410 may also include information used to request aperiodic Channel Quality Indication (CQI) reports, and notifications of MBMS Control CHannel (MCCH) change or uplink power control commands for one cell and one Radio Network Temporary Identifier (RNTI). FIG. 4 illustrates a DCI 410 including resource block assignment information, Modulation and Coding Scheme (MCS), Hybrid-Automatic Repeat reQuest (ARQ) information, and power control information as shown in.

Based on received DCI 410 information, the UE 110 may be configured to generate and transmit to the base station 250 (e.g., 250a-250c) user plane data 420 via PUSCH 322.

Figure 5:
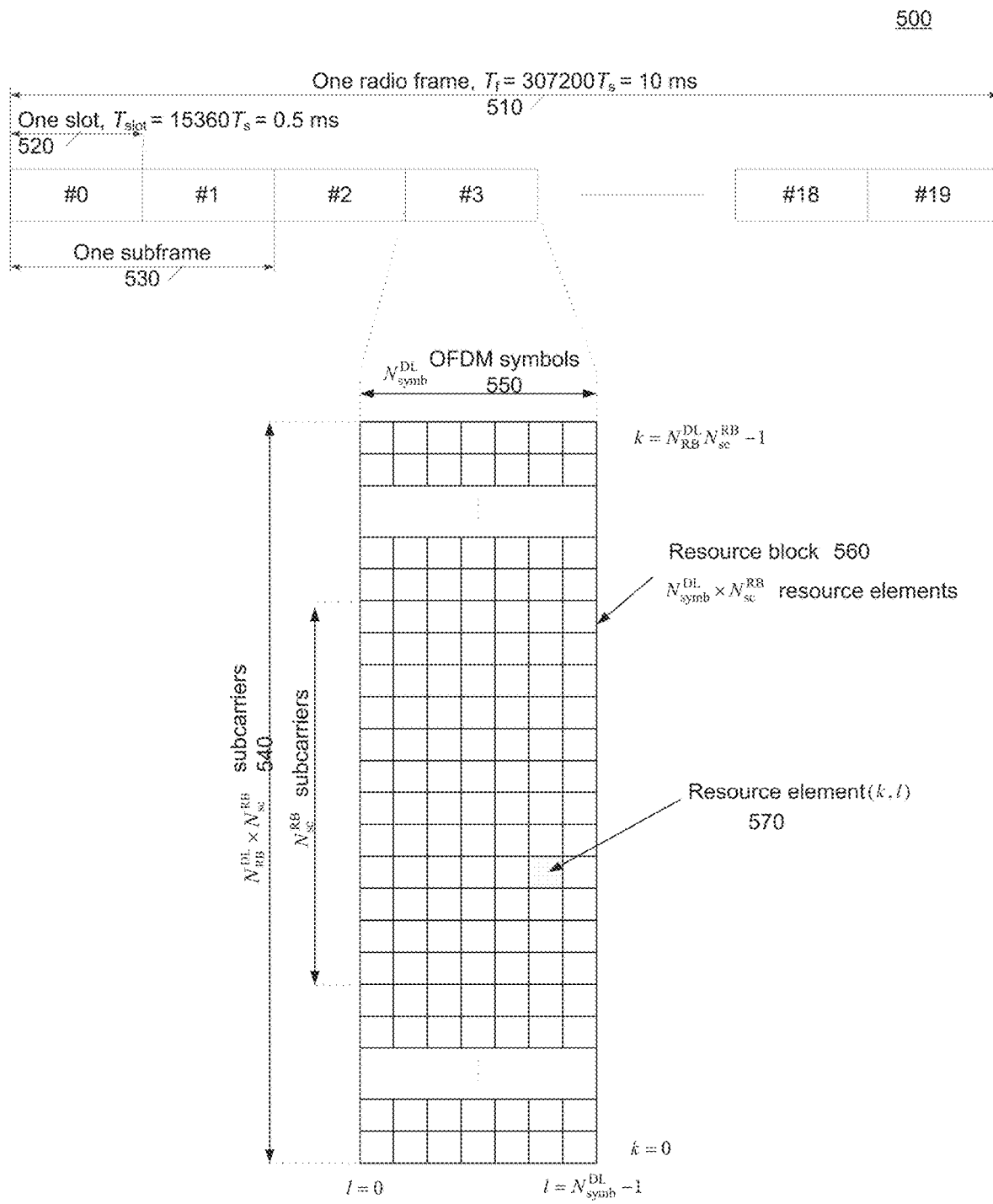
FIG. 5 illustrates an exemplary frame structure including downlink resource grid.

FIG. 5 illustrates an exemplary frame structure 500 in a current LTE system including downlink resource grid. In frame structure 500, each radio frame 510 is $T_f = 307200 \cdot T_s$ 10 ms long and consists of 20 slots 520, numbered 0 to 19, each of length $T_{slot} = 15360 \cdot T_s = 0.5$ ms. A subframe 530 is defined as two consecutive slots 520 where subframe i consists of slots $2i$ and $2i+1$.

As also shown in FIG. 5, resources for signal transmission in each slot are defined by a resource grid of $N_{RB}^{DL} N_{sc}^{RB}$ subcarriers 540 and $N_{symb}^{DL}$ Orthogonal Frequency Division Multiplexing (OFDM) symbols 550. The smallest unit in the resource grid, referred to as a resource element (RE) 570, corresponds to one subcarrier k and one OFDM symbol l and is uniquely identified by an index pair (k,l), where k=0, . . . , $N_{RB}^{DL} N_{sc}^{RB} - 1$ and l=0, . . . , $N_{symb}^{DL} - 1$.

Figure 6:
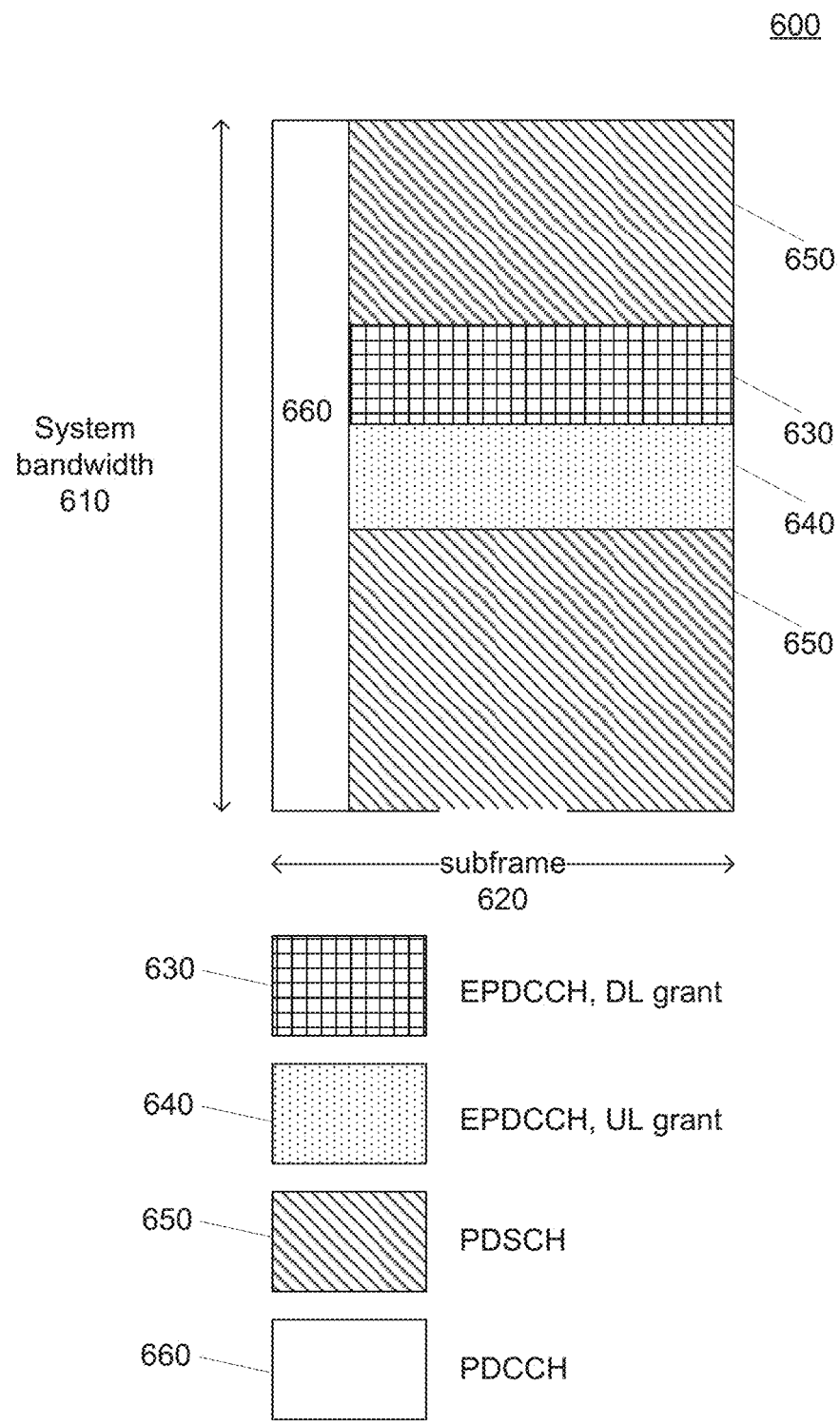
FIG. 6 illustrates an exemplary frame structure.

As discussed above, FIG. 6 shows exemplary frame structure 600 in a current LTE system. UE may receive all downlink control channels as well as downlink shared channel in the same subframe 620. The problem is that UE 110 must use the control information, which includes various configuration parameters, before it can receive and decode data.

Figure 7A:
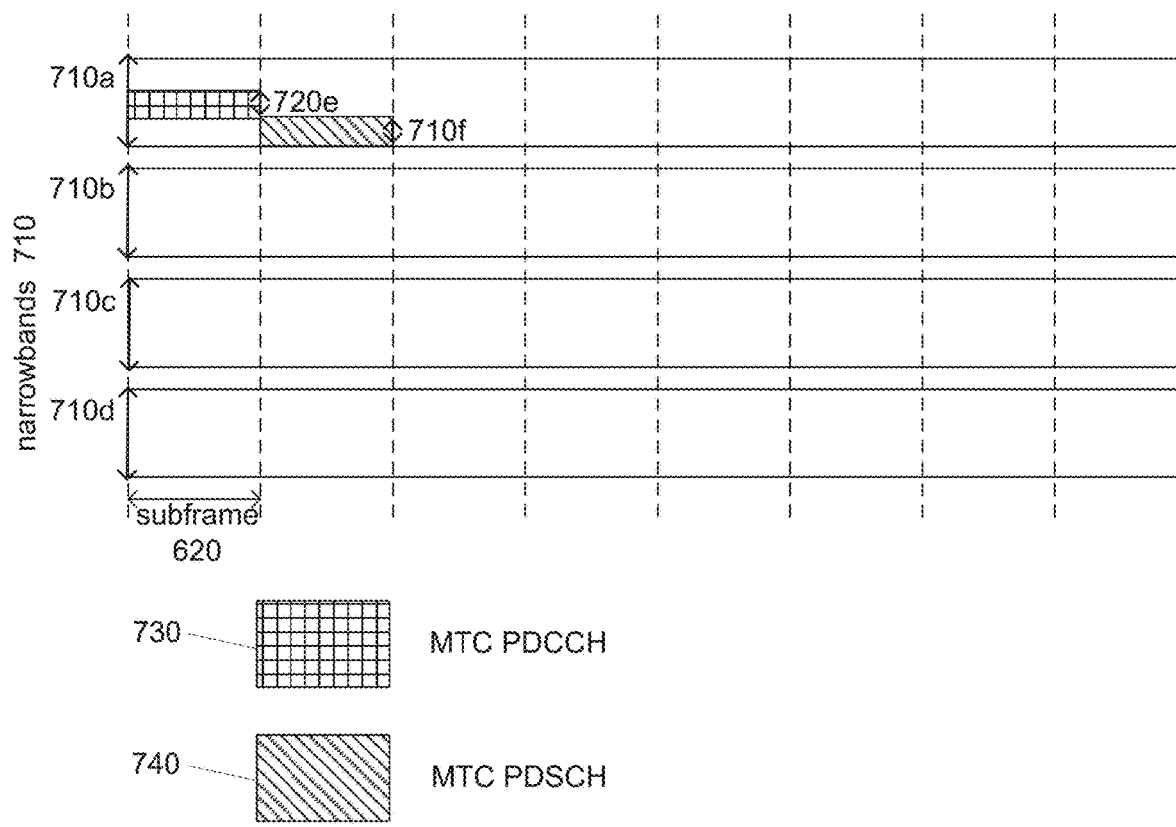
FIG. 7A illustrates an exemplary scheduling method of control and data according to an illustrative embodiment of the present disclosure.

FIG. 7A illustrates an exemplary frame structure 700a for scheduling control and data for an MTC UE. In frame structure 700a, control and data transmissions for an MTC UE can be carried out over 4 narrow bands 710 (i.e., 710a-710d). The MTC UE may be in normal coverage where control and data are transmitted over single subframe in time and a downlink control channel MTC PDCCH 730 reserves part of a narrow band 720e in one narrow band 710a in a single subframe 620 followed by a downlink shared channel MTC PDSCH 740 in another part 710f of narrow band 710a.

Figure 7B:
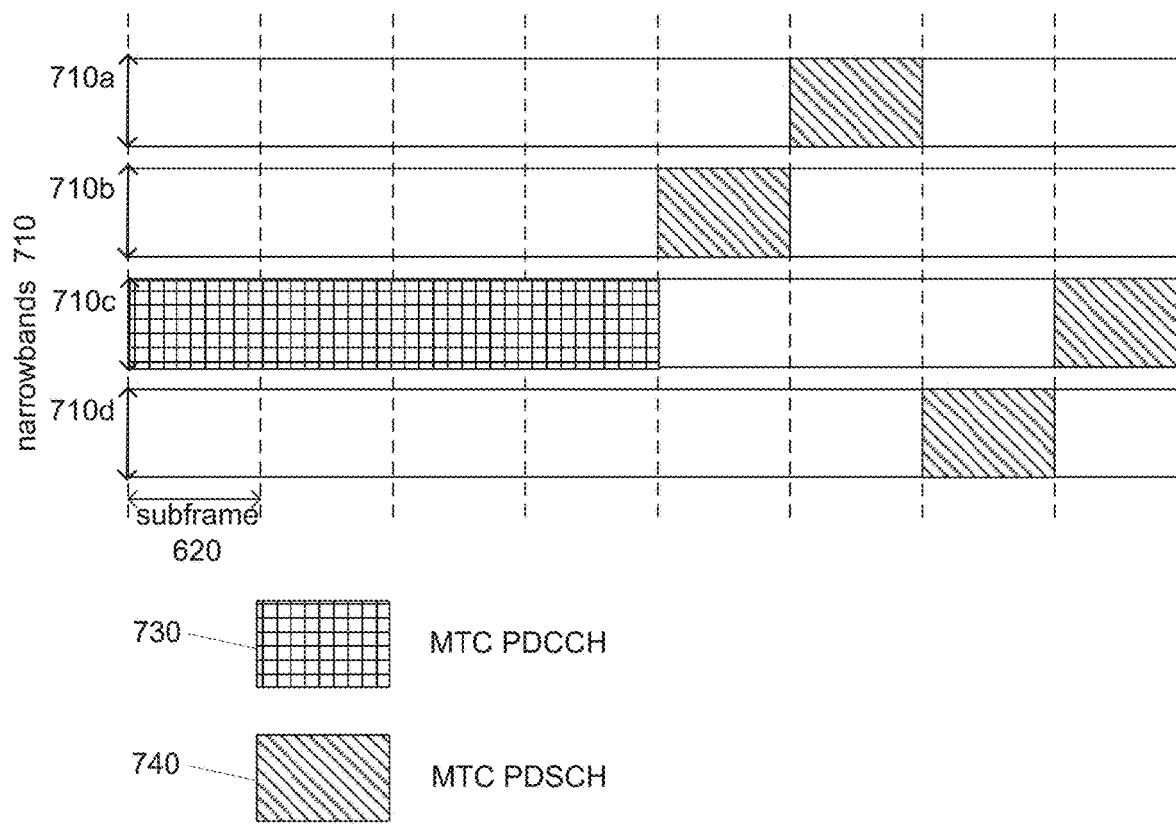
FIG. 7B illustrates another exemplary scheduling method of control and data according to an illustrative embodiment of the present disclosure.

FIG. 7B illustrates another exemplary frame structure 700b for scheduling control and data for an MTC UE according to embodiments of the present disclosure. In frame structure 700b, the MTC UE may be in enhanced coverage mode where repetition of information over multiple subframes is used, in which case the downlink control channel MTC PDCCH 730 may be repeated in 4 subframes over a whole narrow band 710c, followed by the transmission of the downlink shared channel MTC PDSCH 740 repeated in 4 subframes but over 4 different narrow bands 710a-710d, respectively. It is also assumed in this figure that the MTC UE can change to a different narrow band immediately after receiving MTC PDCCH 730 containing downlink grant. If guard time is needed between frequency changes, such a guard time can be added between the frequency changes. A system (e.g., 250) or a UE 110 may also be configured with small guard time between frequency hops, which is not shown in the figure for simplicity.

Figure 8:
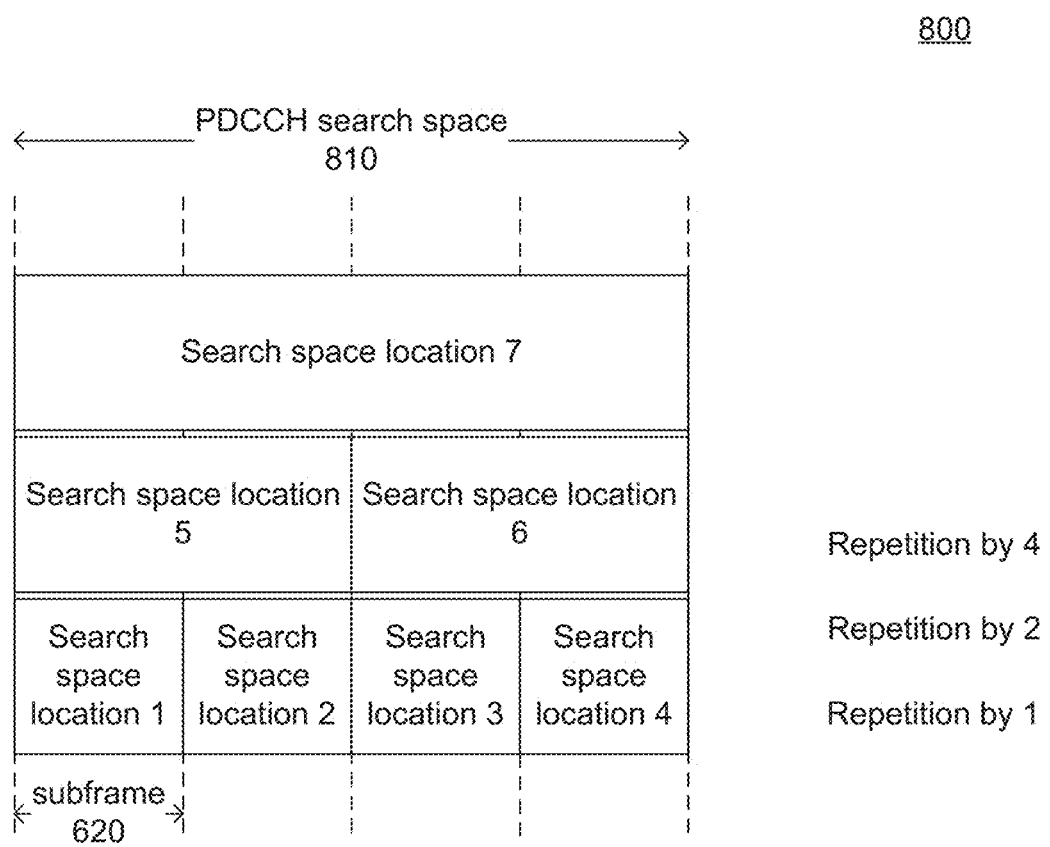
FIG. 8 illustrates an exemplary control channel search space in time domain using repetition levels according to an illustrative embodiment of the present disclosure.

FIG. 8 illustrates an exemplary control channel search space in time domain using repetition levels 1, 2 and 4 according to an illustrative embodiment of the present disclosure. At repetition level 1, subframe 1 is reserved by search space location 1, subframe 2 is reserved by search space location 2 and finally subframe 4 is reserved by search space location 4. At repetition level 2, subframes 1 and 2 are reserved by search space location 5 but subframes 3 and 4 are reserved by search space location 6. Finally, subframes from 1 to 4 are reserved by search space location 7. Naturally all search space locations cannot be used simultaneously for DCI transmission. For example, search space locations 1 and 2 cannot be allocated for transmission of DCI if search space location 5 is already allocated. With regard to MTC PDCCH 730, the enhanced coverage mode leads to a definition of a search space 810 in time. The search space in FIG. 8 is also exampled in 3GPP R1-152698, proposal submitted by LG Electronics, where a UE 110 including an MTC UE searches repetition levels 1, 2 and 4 leading to total 7 candidate locations for DCI. Although all candidate locations are used in this example it is also possible that some of the candidates are left out to simplify decoding. For example, it could be possible that candidate locations 2 and 4 are not part of the defined search space for a single UE. Consistent with disclosure herein, PDCCH search space 810 is considered as PDCCH search space in the context of MTC.

Figure 9:
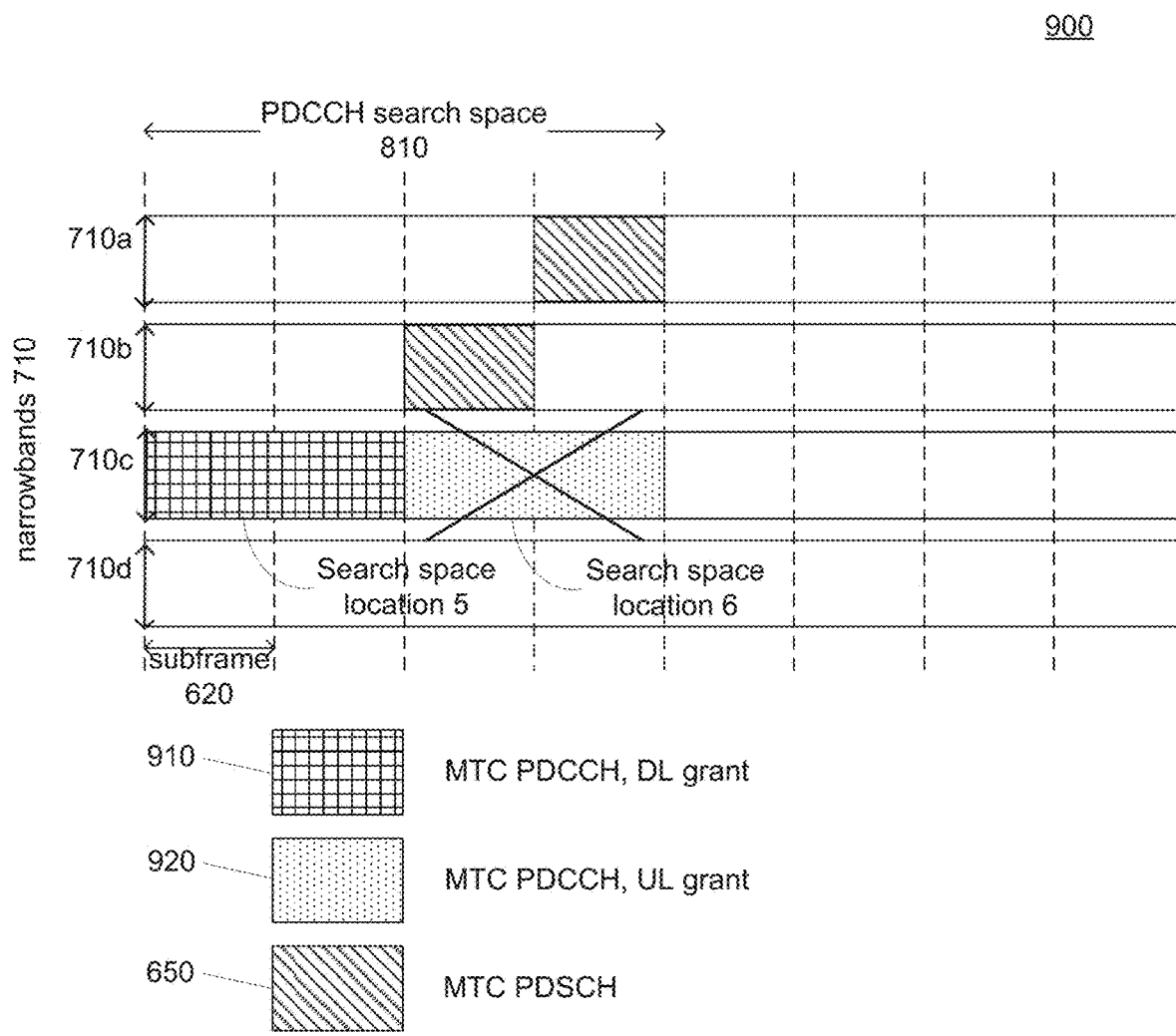
FIG. 9 illustrates missed control information according to an illustrative embodiment of the present disclosure.

FIG. 9 illustrates a situation of missed control information according to an illustrative embodiment of the present disclosure. The MTC UE may be configured to receive MTC PDCCH 910 with downlink grant using time repetition of 2. This could be located for example in search space location 5 in FIG. 8 (subframes 1 and 2 in search space). The UE may be instructed by the downlink grant to start reception of MTC PDSCH 650 at other narrow bands, e.g., 710a and 710b. If, however, other control information is transmitted on the downlink control channel later in the search space 810, e.g., a transmission of MTC PDCCH 920 with uplink grant on search space location 6 defined in FIG. 8, such later transmission of control information would be lost unless the MTC PDSCH 650 transmission starts after the end of the whole search space 810. One solution could be allowing changing a downlink narrow band only at the border of a search space; however, this approach would set quite a restriction to scheduling of UEs PDSCH that do not need repetition or need low number of repetitions and have search space configured for high repetition rates as well. According to this approach, network could only transmit data to such UEs after end of each PDCCH search space although UE would be in such propagation condition that data could be transmitted in every subframe.

Figure 10:
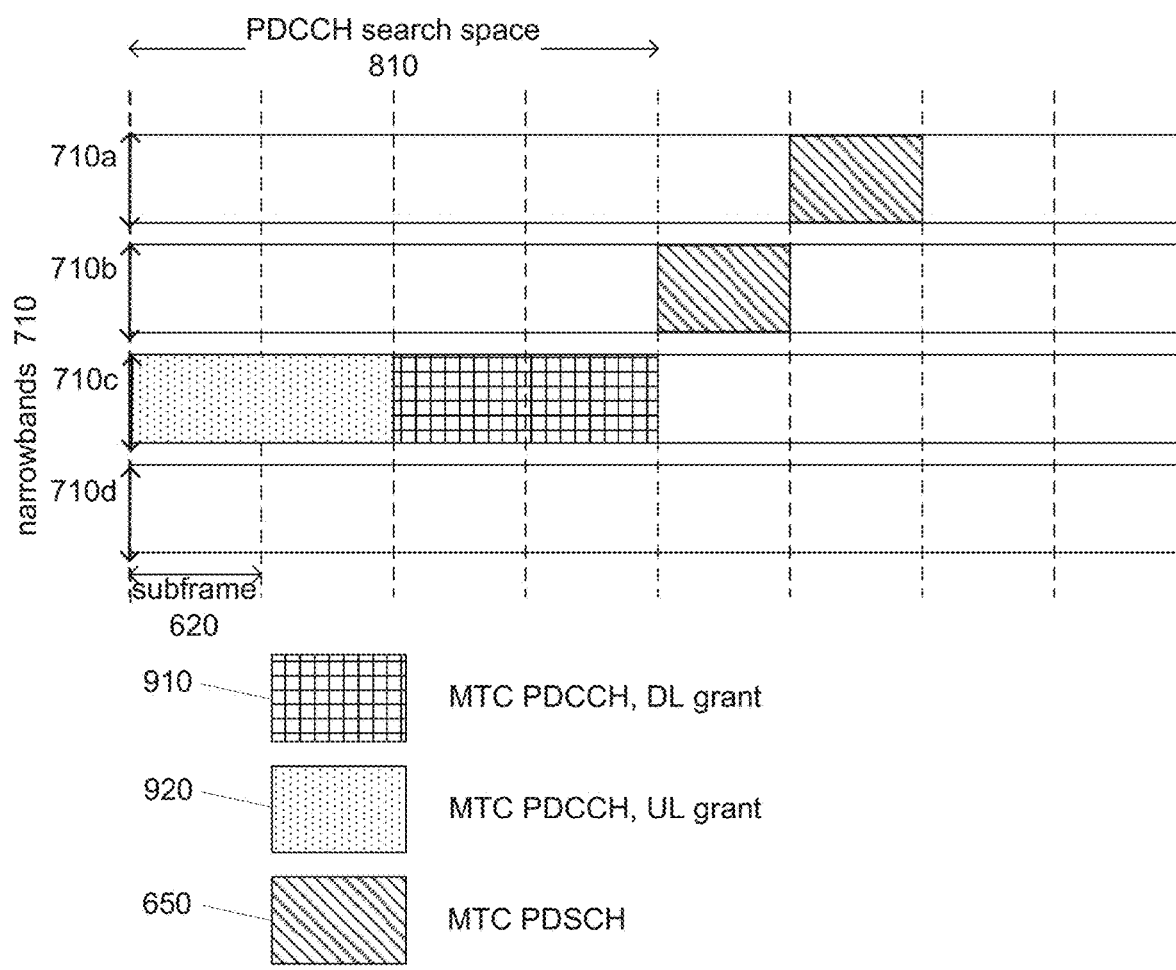
FIG. 10 illustrates an exemplary scheduling method in one embodiment according to an illustrative embodiment of the present disclosure.

FIG. 10 illustrates an exemplary frame structure 1000 according to embodiments of the present disclosure. In FIG. 10, MTC PDCCH 910 with downlink grant may be optionally transmitted last in PDCCH search space 810 over a narrow band 710c. The MTC UE may be configured to change into another narrow band (e.g., 710a and/or 710b) after receiving the MTC PDCCH 910 with downlink grant, assuming no other control information follows and the narrow band containing the downlink grant does not need to be monitored further. The MTC UE may change into another narrow band immediately after receiving a downlink grant, or do so after a guard time. This order of DCI allocation and the UE assumption that no other DCI follows the DCI containing the downlink grant for a UE could be considered as one embodiment of invention.

Figure 11:
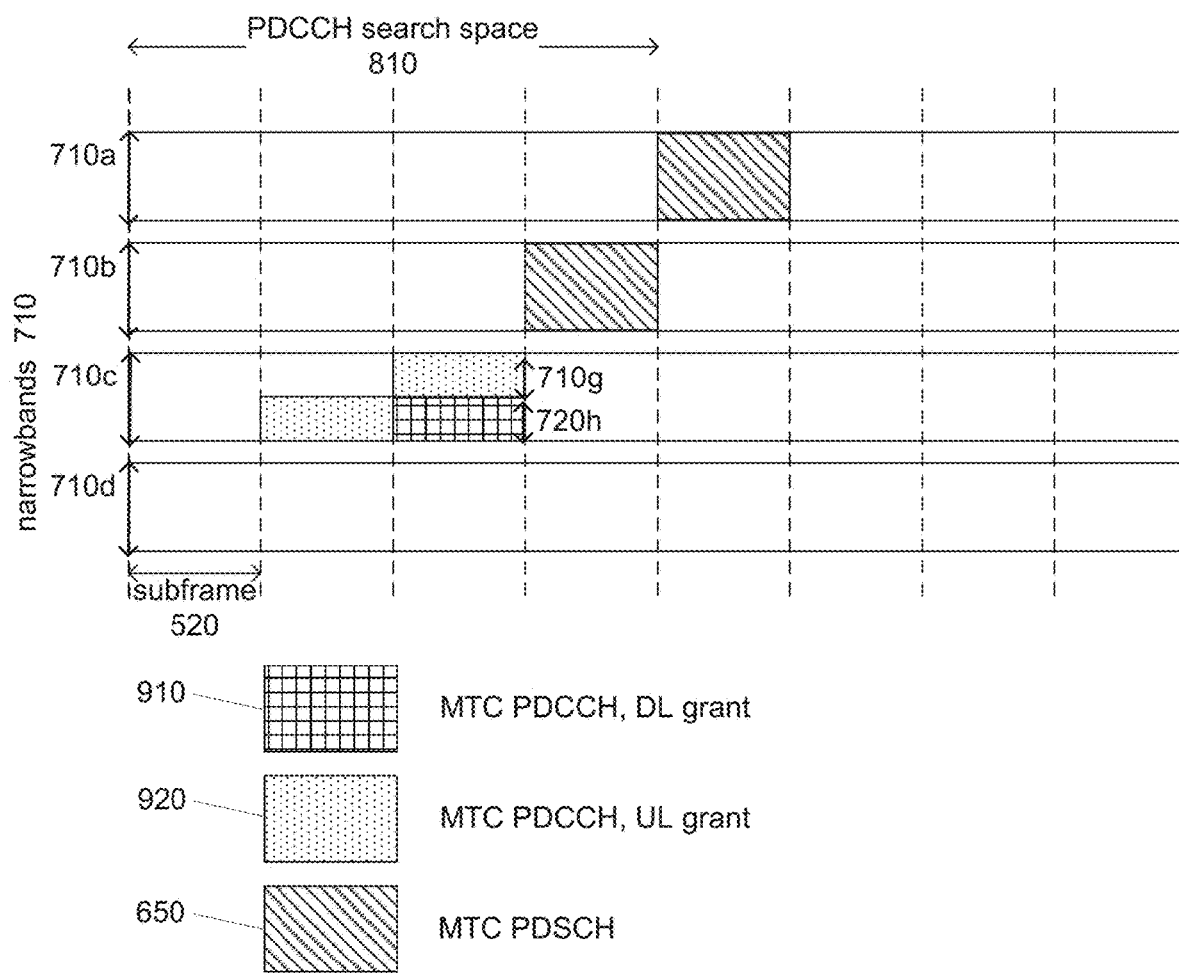
FIG. 11 illustrates an exemplary scheduling method in another embodiment according to an illustrative embodiment of the present disclosure.

FIG. 11 illustrates an exemplary frame structure 1100 according to embodiments of the present disclosure. In FIG. 11, MTC PDCCH 910 with downlink grant is transmitted on part 720h of narrow band 710c and ends before the end of the PDCCH search space 810. The MTC UE assumes no further MTC PDCCH control information follows the downlink grant, and the transmission of MTC PDSCH 650 on another narrow band (e.g., 710b) can start before the end of the PDCCH search space 810. FIG. 11 also depicts two alternative locations in two different subframes for other control messages, such as MTC PDCCH 920 with uplink grant, power control commands, and/or HARQ ACKnowledgement (ACK)/Negative ACK (NACK) indications. MTC PDCCH 920, which includes control information other than downlink grant, may be scheduled earlier in time in the PDCCH search space 810 or at the latest in the same subframe as the transmission of the downlink grant information over MTC PDCCH 910. The UE assumption that no other DCI follows the DCI containing the downlink grant for a UE is considered as one embodiment of the invention. A more general embodiment can also be defined. The UE may assume that no other DCI follow a predefined DCI later in time and UE may stop searching the search space when decoding the predefined DCI. The predefined DCI may be defined in a specification.

Figure 12:
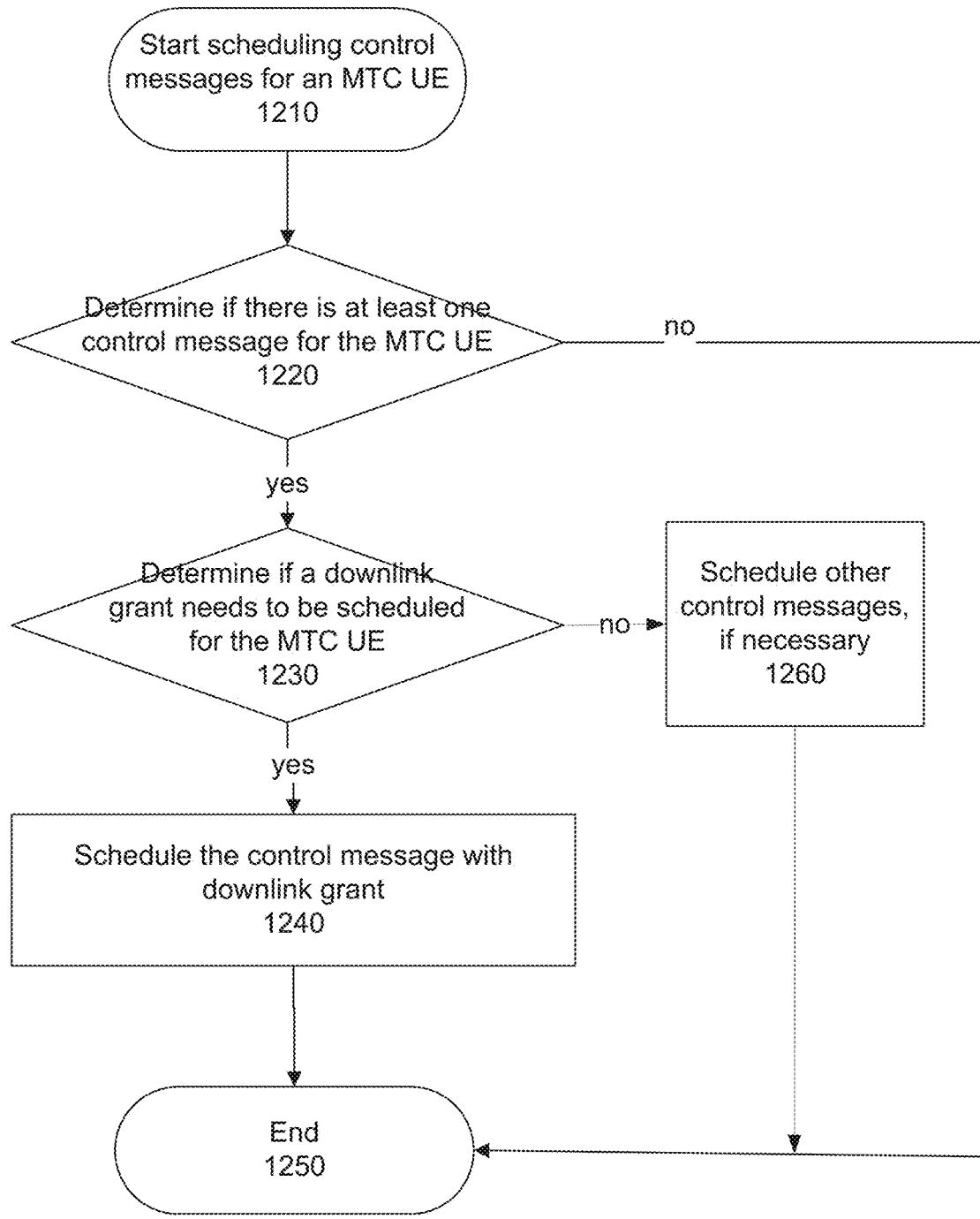
FIG. 12 illustrates an exemplary process of scheduling control messages for a UE according to an illustrative embodiment of the present disclosure.

FIG. 12 illustrates an exemplary process 1200 of scheduling control messages for an MTC UE according to embodiments of the present disclosure. The process 1200 may be performed by various devices in the system, e.g., a base station, a Node B, an eNB, an initial access point that an MTC UE to transmit and receive radio signals.

The scheduling of control messages for a specific MTC UE starts at step 1210. At step 1220, a determination is made as to whether there is at least one control message for the MTC UE.

Once determined that there is at least one control message for the MTC UE, at step 1230, a determination is made as to whether a downlink grant needs to be scheduled for the MTC UE. The process 1200 may assign one or more downlink grants in a control channel search space. The control message may be transmitted on PDCCH or E-PDCCH.

After determining that a downlink grant needs to be scheduled for the MTC UE, process 1200 further schedules the control messages including control message for the downlink grant at step 1240. For example, if multiple control messages will be transmitted to the MTC UE, the control message with the downlink grant may be scheduled at an end of all control messages for the MTC UE within a control channel search space. The control messages may be transmitted over the entirety or a part of a narrow band. After the transmission of the control messages, transmission of user plane data over PDSCH to the MTC UE may start.

When determining that a downlink grant need not be scheduled for the MTC UE, at step 1260 the process 1200 further checks and schedules other control messages such as uplink grant or power control commands, if necessary.

Figure 13:
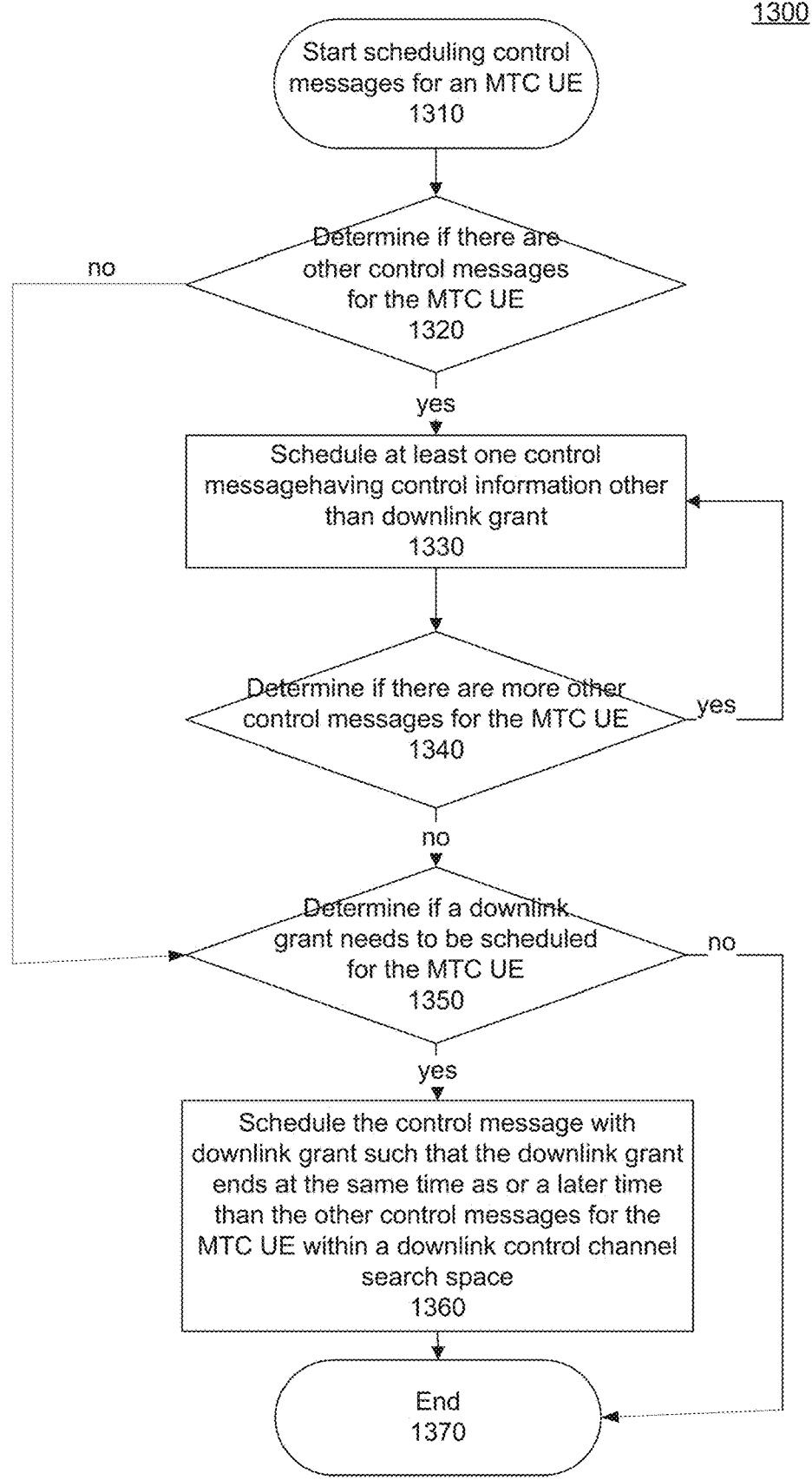
FIG. 13 illustrates another exemplary process of scheduling control messages for a UE according to an illustrative embodiment of the present disclosure.

FIG. 13 illustrates another exemplary process 1300 of scheduling control messages for an MTC UE according to embodiments of the present disclosure. Process 1300 may be performed by various devices in the system, e.g., base station, Node B, eNB, an initial access point, etc.).

Scheduling of control messages for an MTC UE starts at step 1310. Step 1320 includes determining if there are other control messages for the MTC UE. Other control messages may include a plurality of control information such as uplink grants, power control commands, HARQ ACK/NACK notifications, etc. When determining that there are other control messages for the MTC UE, the process 1300 may further include scheduling at least one control message having control information other than downlink grant at step 1330. When determining that there are no other control messages for the MTC UE, the process 1300 may go to the step 1350.

Step 1340 may further include determination of whether there is a need to schedule more other control messages in a downlink control channel search space for the MTC UE. Other control messages may include a plurality of control information such as uplink grants, power control commands, HARQ ACK/NACK notifications, etc.

When determined that there are more other control messages for the MTC UE, the process may go back to the step 1330 to schedule those control messages.

Once determined that there are no more other control messages for the MTC UE, at step 1340, a determination is made as to whether a downlink grant needs to be scheduled for the MTC UE at step 1350. Optionally, the process 1300 may assign downlink grant in a downlink control channel search space. The control message may be transmitted on PDCCH or E-PDCCH.

After determining that a downlink grant needs to be scheduled for the MTC UE, the process further schedules a control message with downlink grant at step 1360. For example, a control message with downlink grant will be transmitted to the MTC UE, the control message with the downlink grant may be scheduled such that the downlink grant ends at a same time or later with other plurality of control messages for the MTC UE within a downlink control channel search space. The control message may be transmitted over the entirety or a part of a narrow band. After the transmission of the control message, transmission of user plane data over PDSCH to the MTC UE may start.

Figure 14:
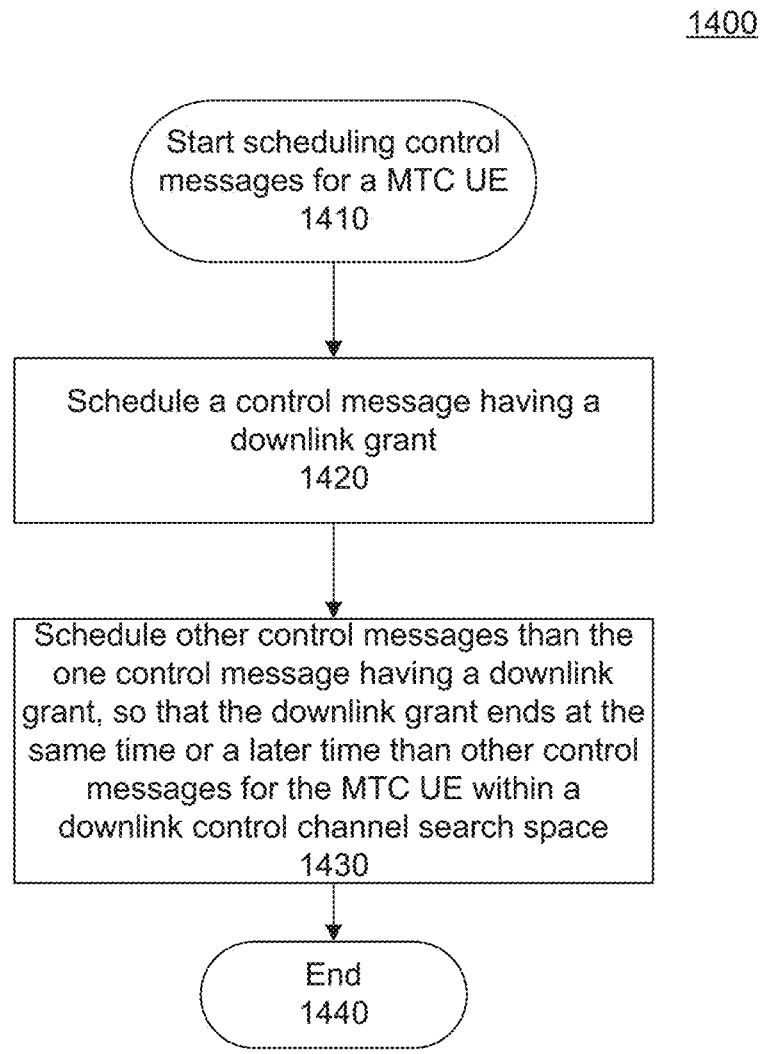
FIG. 14 illustrates another exemplary process of scheduling control messages for a UE according to an illustrative embodiment of the present disclosure.

FIG. 14 illustrates another exemplary process 1400 of scheduling control messages for an MTC UE according to an illustrative embodiment of the present disclosure. The process 1400 may be performed by various devices included in systems (e.g., base station, Node B, eNB, an initial access point, etc.).

The scheduling of control messages for the MTC UE starts at step 1410. Step 1420 includes scheduling of a control message having a downlink grant. The process 1400 may also include adding a downlink grant in the control message at step 1420. The one control message may be transmitted over PDCCH or E-PDCCH.

The process 1400 may further include scheduling other control messages than the one possibly scheduled control message with a downlink grant at step 1430. For example, if the one control message with downlink grant will be transmitted to the MTC UE, the control message with the downlink grant may be scheduled such that it ends at a same time or later with the other control messages for the MTC UE within a downlink control channel search space. The control message may be transmitted over the entirety or a part of a narrow band. After the transmission of the control message, transmission of user plane data over PDSCH to the MTC UE may start.

Figure 15:
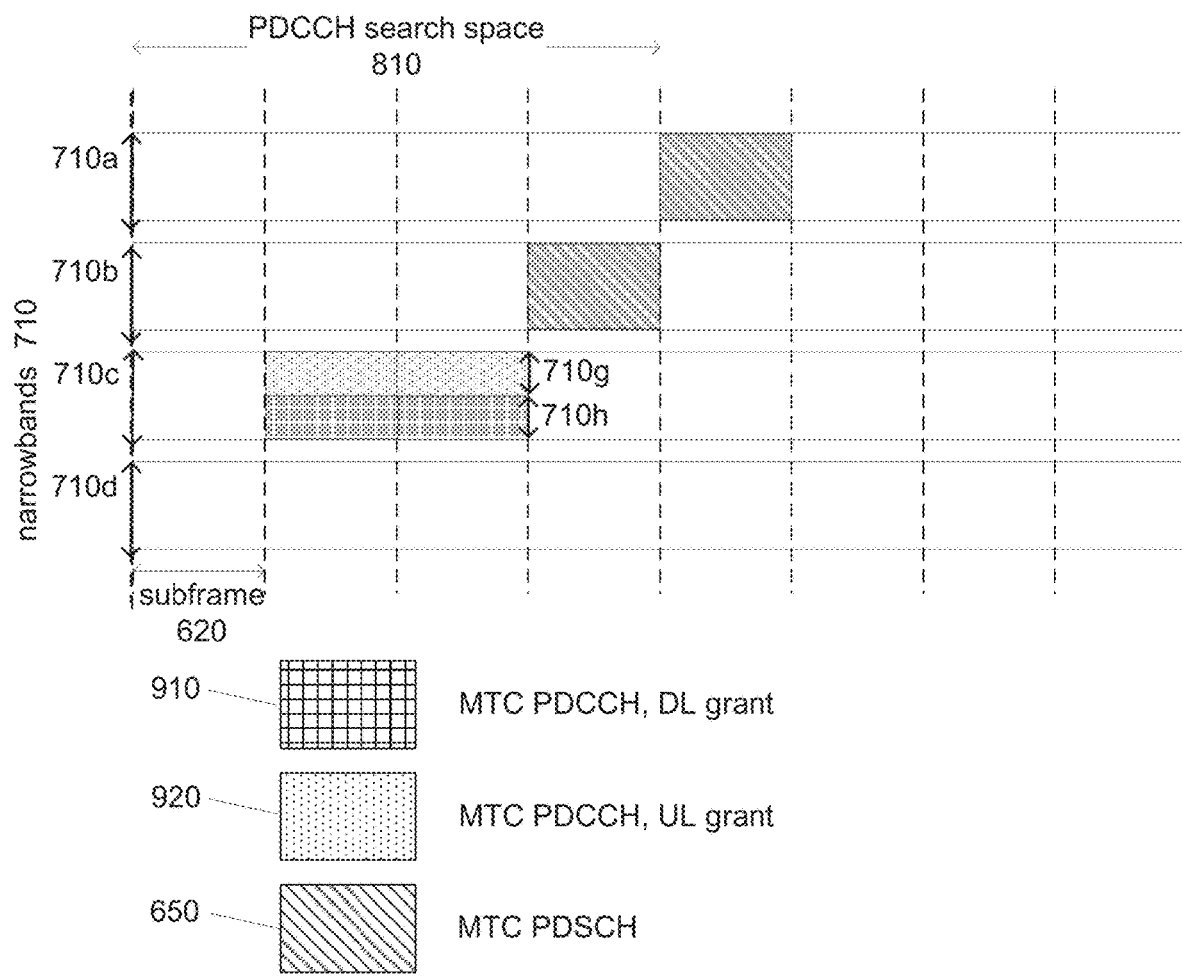
FIG. 15 illustrates an exemplary scheduling method in another embodiment according to an illustrative embodiment of the present disclosure.

FIG. 15 illustrates an exemplary scheduling method in another embodiment according to an illustrative embodiment of the present disclosure. In some embodiment, uplink and downlink grants may be transmitted at the same time. In this case, it may be possible to assume that both uplink and downlink grants are transmitted with the same number of repetitions since they are transmitted to the same UE and hence propagation conditions should be the same. FIG. 15 shows such simultaneous transmission of uplink and downlink grants to a UE 110. MTC PDCCH downlink grant 910 is reserving part of a narrow band 710h in one narrow band 710c. MTC PDCCH uplink grant 920 is reserving part of a narrow band 710g in one narrow band 710c. Both 910 and 920 are transmitted over two subframes and end before the end of PDCCH search space 810. As a UE 110 including an MTC UE can assume that no further MTC PDCCH control information is scheduled after receiving both uplink and downlink grants, MTC PDSCH 650 transmission on another narrow band (e.g., 710b) can be started before the end of the PDCCH search space 810.

Figure 16:
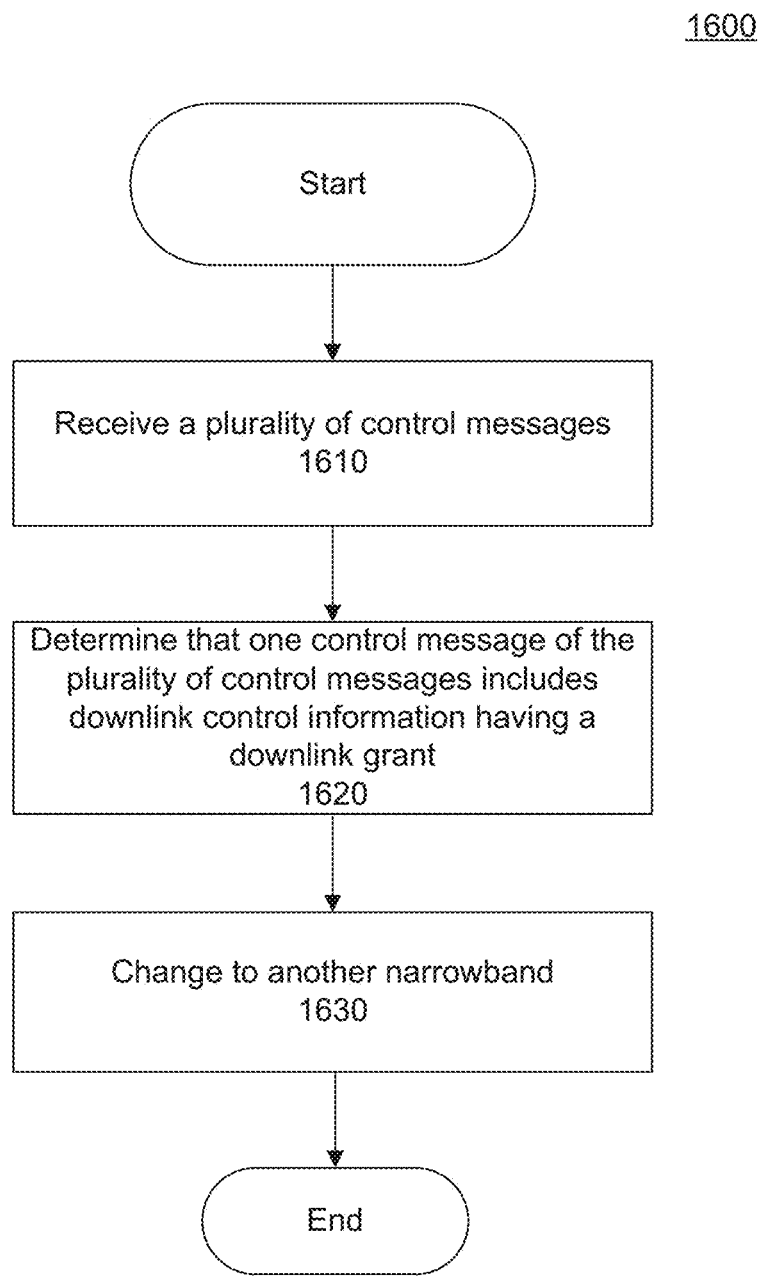
FIG. 16 illustrates an exemplary process of scheduling control messages according to an illustrative embodiment of the present disclosure.

FIG. 16 illustrates an exemplary process of scheduling control messages according to an illustrative embodiment of the present disclosure. The process 1600 illustrates MTC UE processing of received PDCCH. The process 1600 may include receiving a plurality of control messages at step 1610. The process 1600 may also include monitoring reception of the plurality of control messages at at least one repetition level within a search space. The at least one repetition level may comprise at least one of e.g. 1, 2, or 4 repetition levels.

The process 1600 may also include determining that one control message of the plurality of control messages includes DCI with a downlink grant at step 1620. The one control message may be transmitted over PDCCH or E-PDCCH. Where, the downlink grant is received one time on a narrow band in a search space. A search space may be a downlink control channel search space. The process 1600 may further include decoding the received downlink grant.

After determining reception of a downlink grant in a narrow band, the process 1600 may further include changing into another narrow band at step 1630. The process may also include stopping decoding of any subsequent control message which may end later than the successfully decoded downlink grant. The process may further include receiving a user plane data over PDSCH on the changed narrow band.

The examples so far define that the downlink grant control message is the indication message for the UE that no more control messages exists later in the search space. Broader scope of the control message grouping could also be defined. The control messages are divided to two groups, other control messages and indication control message. The other control messages may include uplink grants, power control commands and HARQ ACK/NACKs. The indication message would be the downlink grant control message which would serve as an indication message that no more control messages appear later in the downlink control channel search space. The grouping may also be different. For example the other control messages could include at least power control commands, HARQ ACK/NACKs and downlink grants. The indication message in this case could be the uplink grant.

Figure 17:
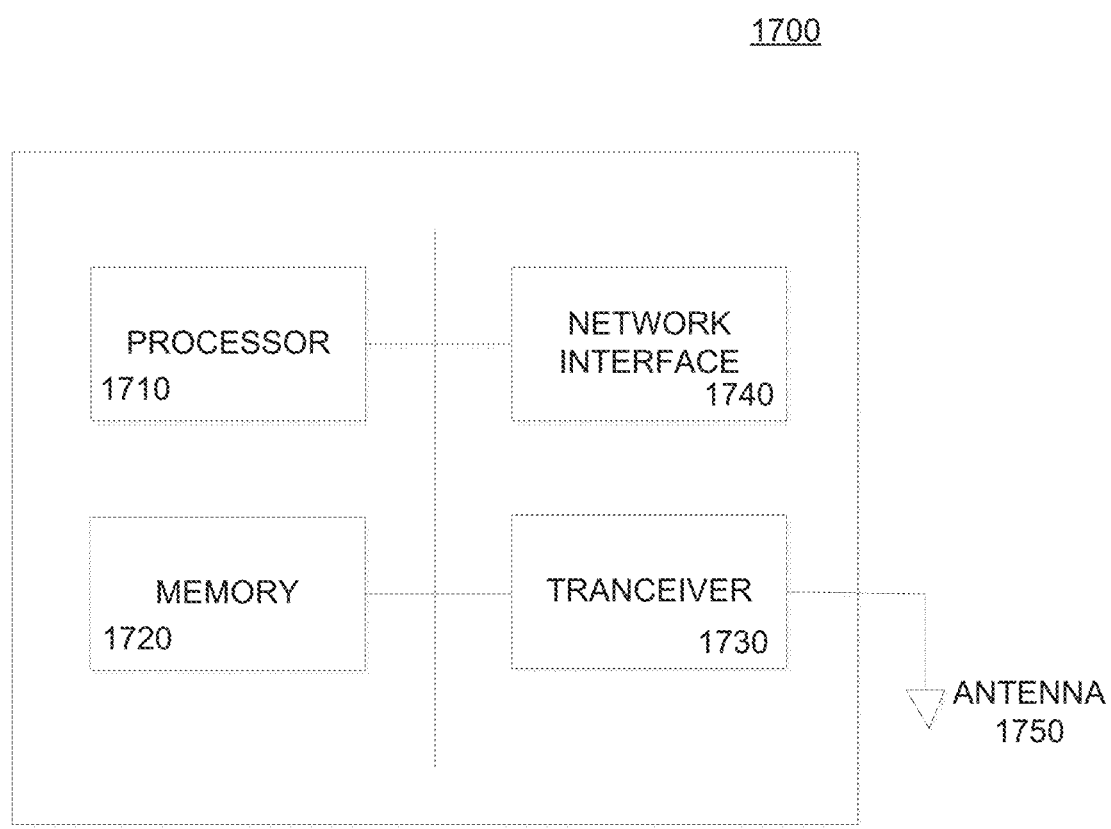
FIG. 17 illustrates an exemplary block diagram of a system apparatus and/or a UE apparatus according to an illustrative embodiment of the present disclosure.

FIG. 17 illustrates an exemplary block diagram of an apparatus 1700 consistent with embodiments of the present disclosure. Apparatus 1700 may be a base station, a Node B, an eNB, a UE, or an MTC UE. Apparatus 1700 may include one or more processors 1710, one or more memories 1720, one or more transceivers 1730, one or more network interfaces 1740, and one or more antennas 1750.

The one or more processors 1710 may comprise a CPU (central processing unit) and may include a single core or multiple core processor system with parallel processing capability. The one or more processors 1710 may use logical processors to simultaneously execute and control multiple processes. One of ordinary skill in the art would understand that other types of processor arrangements could be implemented that provide for the capabilities disclosed herein.

The one or more processors 1710 execute some or all of the functionalities described above for either a UE 110 apparatus or a system (e.g., base station 250) apparatus. Alternative embodiments of the system apparatus may include additional components responsible for providing additional functionality, including any of the functionality identified above and/or any functionality necessary to support the embodiments described above.

The one or more memories 1720 may include one or more storage devices configured to store information used by the one or more processors 1710 to perform certain functions according to exemplary embodiments. The one or more memories 1720 may include, for example, a hard drive, a flash drive, an optical drive, a random-access memory (RAM), a read-only memory (ROM), or any other computer-readable medium known in the art. The one or more memories 1720 can store instructions to be executed by the one or more processors 1710. The one or more memories 1720 may be volatile or non-volatile, magnetic, semiconductor, optical, removable, non-removable, or other type of storage device or tangible computer-readable medium.

The one or more transceivers 1730 are used to transmit signals to one or more radio channels, and receive signals transmitted through the one or more radio channels via one or more antennas 1750.

The one or more network interfaces 1740 may comprise wired links, such as an Ethernet cable or the like, and/or wireless links to one or more entities such as access nodes, different networks, or UEs. The one or more network interfaces 1740 allow the one or more processors 1710 to communicate with remote units via the networks.

While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A method performed by a user equipment (UE), the method comprising:

receiving a downlink grant on a first narrow band in a first subframe, wherein the first narrow band and the first subframe are in a search space, the search space including one or more narrow bands and a plurality of subframes;
determining whether user plane data is to be received in a second subframe, the second subframe occurring later than the first subframe and beginning prior to the end of the search space; and
if user plane data is to be received in the second subframe:
stopping searching the search space for control information in the second subframe; and
receiving, based on the downlink grant, the user plane data on a second narrow band in the second subframe.

2. The method of claim 1, wherein the user plane data is received on a Physical Downlink Shared Channel (PDSCH).

3. The method of claim 1, wherein the downlink grant is received on at least one of Physical Downlink Control Channel (PDCCH), PDCCH for MTC UE, and Enhanced-PDCCH (E-PDCCH).

4. The method of claim 1, further comprising:
receiving a plurality of control messages in the search space, wherein the downlink grant is received at a later subframe than one or more other control messages of the plurality of control messages within the search space.

5. The method of claim 4, wherein the one or more other control messages include an uplink grant, a power control command, an acknowledgement (ACK), or a negative ACK (NACK).

6. The method of claim 4, wherein the downlink grant ends last among the plurality of control messages.

7. The method of claim 1, wherein the downlink grant is received in the search space based on a repetition in time domain.

8. The method of claim 7, wherein the downlink grant is received in the search space at a repetition level of one, two, or four.

9. A user equipment (UE) comprising:
a memory storing instructions; and
at least one processor configured to execute the instructions to cause the UE to perform:
receiving a downlink grant on a first narrow band in a first subframe, wherein the first narrow band and the first subframe are in a search space, the search space including one or more narrow bands and a plurality of subframes;
determining whether user plane data is to be received in a second subframe, the second subframe occurring later than the first subframe and beginning prior to the end of the search space; and
if user plane data is to be received in the second subframe:
stopping searching the search space for control information in the second subframe; and
receiving, based on the downlink grant, the user plane data on a second narrow band in the second subframe.

10. The UE of claim 9, wherein the user plane data is received on a Physical Downlink Shared Channel (PDSCH).

11. The UE of claim 9, wherein the downlink grant is received on at least one of Physical Downlink Control Channel (PDCCH), PDCCH for MTC UE, and Enhanced-PDCCH (E-PDCCH).

12. The UE of claim 9, wherein the processor is further configured to execute the instructions to cause the UE to perform:
receiving a plurality of control messages in the search space, wherein the downlink grant is received at a later subframe than one or more other control messages of the plurality of control messages within the search space.

13. The UE of claim 12, wherein the one or more other control messages include an uplink grant, a power control command, an acknowledgement (ACK), or a negative ACK (NACK).

14. The UE of claim 12, wherein the downlink grant ends last among the plurality of control messages.

15. The UE of claim 9, wherein the downlink grant is received in the search space based on a repetition in time domain.

16. The UE of claim 15, wherein the downlink grant is received in the search space at a repetition level of one, two, or four.

* * * * *